US005684665A

United States Patent [19]

Rudy

[11] Patent Number: 5,684,665

[45] Date of Patent: Nov. 4, 1997

[54] MODULAR ELECTRICAL ASSEMBLY WITH CONDUCTIVE STRIPS

[75] Inventor: Richard B. Rudy, Medina, Ohio

[73] Assignee: Hubbell Incorporated, Orange, Conn.

[21] Appl. No.: 644,127

[22] Filed: May 10, 1996

[51] Int. Cl.$^6$ .......... H02H 9/00

[52] U.S. Cl. .......... 361/117; 361/127

[58] Field of Search .......... 361/56, 91, 117, 361/118, 115, 127

[56] References Cited

U.S. PATENT DOCUMENTS

| | | | |
|---|---|---|---|
| 4,656,555 | 4/1987 | Raudabaugh | 361/117 |
| 4,812,944 | 3/1989 | Eberhard | 361/127 |
| 5,043,838 | 8/1991 | Sakich | 361/117 |

*Primary Examiner*—Jeffrey A. Gaffin
*Assistant Examiner*—Stephen Jackson
*Attorney, Agent, or Firm*—Jerry M. Presson; Mark S. Bicks

[57] ABSTRACT

A modular electrical assembly including a plurality of conductive electrical components aligned in a column along an axis and electrically connected at axially directed ends. First and second conductive end members are located at opposite sides of the column, the end members having shoulders extending radially relative to the axis, each shoulder having an outer surface facing radially outwards. A non-conductive winding is wrapped in a predetermined pattern about the electrical components and the end members, engaging the shoulders, and applying an axially directed compressive force through the shoulders on the electrical components and end members to maintain electrical connection therebetween. A housing encompasses the winding, while a strip, located between the housing and the winding, covers the outer surface of the first end member to protect the housing from contact with the outer surface of the shoulders. The strip also covers voids between the first end member and the non-conductive winding.

18 Claims, 2 Drawing Sheets

MODULAR ELECTRICAL ASSEMBLY WITH CONDUCTIVE STRIPS

FIELD OF THE INVENTION

The present invention relates to polymer housed electrical assemblies which are formed as modules and which can be selectively coupled together to vary the overall electrical rating of the device. Each electrical assembly is formed from electrical components that are wrapped with a non-conductive filament winding between end members and is enclosed within a weathershed housing. Conductive strips surround the connection between the filament winding and the end members within the housing to cover edges of the end members and voids adjacent thereto.

BACKGROUND OF THE INVENTION

A surge protector or arrester is commonly connected across a comparatively expensive piece of electrical equipment to shunt over-current surges. Such over-current surges occur, for example, when lightning strikes. When this happens, the surge arrester shunts the surge to ground, thereby protecting the piece of electrical equipment and the circuit from damage or destruction.

Present day surge arresters commonly include an elongated, hollow cylindrical housing made of porcelain or the like, and a plurality of non-linear resistive blocks within the housing. Some of these structures also include spark gaps, the blocks and gaps being electrically interconnected to handle voltage and current surge conditions arising on a power line. The blocks commonly contain silicone carbide (SIC) or metal oxide varistors (MOV), and are usually in the shape of relatively short cylinders stacked within the arrester housing. The number of blocks employed is a function of the material (SIC or MOV) and the voltage and current ratings of the assembly.

For a surge arrester to function properly, intimate contact must be maintained between the MOV or SIC blocks. This necessitates placing an axial load on the blocks within the housing. Some prior art arresters utilize bulky contact springs within the housing to provide this axial load. In the surge arrestor of commly assigned U.S. Pat. No. 5,043,838 to Sakich entitled Modular Electrical Assemblies with Pressure Relief, the subject matter of which is hereby incorporated by reference, a non-conductive filament winding applies an axially directed compressive force on the MOV or SIC blocks to maintain their electrical connection. The filament winding also defines a pattern with lateral openings therein for venting gases generated upon failure of one of the electrical components.

A surge arrestor utilizing a non-conductive filament winding to create axial-directed compressive forces provides many improvements over previous surge arrestors. For example, they minimize damage upon electrical component failure. However, voids may occur at the connection between the filament winding and flanges of the end members around which the filaments are wound. Such voids could result in premature failure of the weathershed housing under certain conditions.

The voids expose the sharp edges of the flanges and also result in radial voids between the filament winding and the throughbore in the weathershed housing which receives the filament winding. Under certain conditions, the flange edges and the voids cause the weathershed housing to puncture at high arrestor maximum continuous operating voltages.

SUMMARY OF THE INVENTION

Accordingly, an object of this invention is to provide an electrical assembly, particularly for a surge arrester, which can be formed using a non-conductive filament winding and operated safely at high operating voltages.

A further object of this invention is to provide an electrical assembly, such as a surge arrestor, with conductive strips surrounding the connections between a non-conductive filament winding and respective end members to cover exposed end member edges and voids adjacent thereto to avoid puncture of the weathershed housing at high operating voltages.

The foregoing objects are basically attained by a modular electrical assembly comprising a plurality of conductive electrical components aligned in a column along an axis and electrically connected at axially directed ends. First and second conductive end members are located at opposite sides of the column and have shoulders extending radially relative to the axis. Each shoulder has an outer surface facing radially outwards. A non-conductive winding is wrapped in a predetermined pattern about the electrical components and the end members, engaging the shoulders and applying an axially directed compressive force through the shoulders on the electrical components and end members to maintain electrical connection therebetween. A housing encompasses the winding. A strip, located between the housing and the winding, covers the outer surface of the first end member to protect the housing from contact with the outer surface of the shoulders.

The strip covers voids between the first end member and the non-conductive winding. The strip therefore creates a substantially continuous connection between the inner cylindrical surface of the housing and the winding. The improved connection formed by the strip distributes forces more evenly along the housing, thereby decreasing the risk of a housing puncture.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this disclosure.

DETAILED DESCRIPTION OF PREFERRED EMBODIMENT

Figure 1:
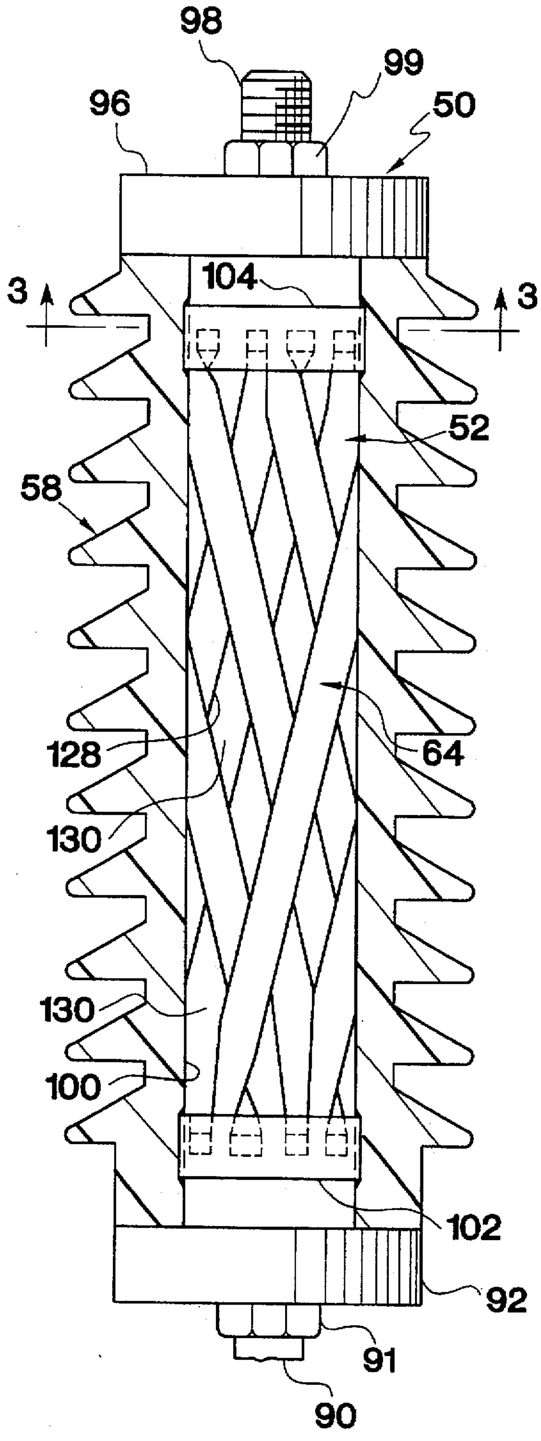
FIG. 1 is a side elevational view in partial section of a modular electrical assembly in the form of a surge arrester, in accordance with the present invention, illustrating the outer surface of the filament winding and the conductive strip.
Figure 2:
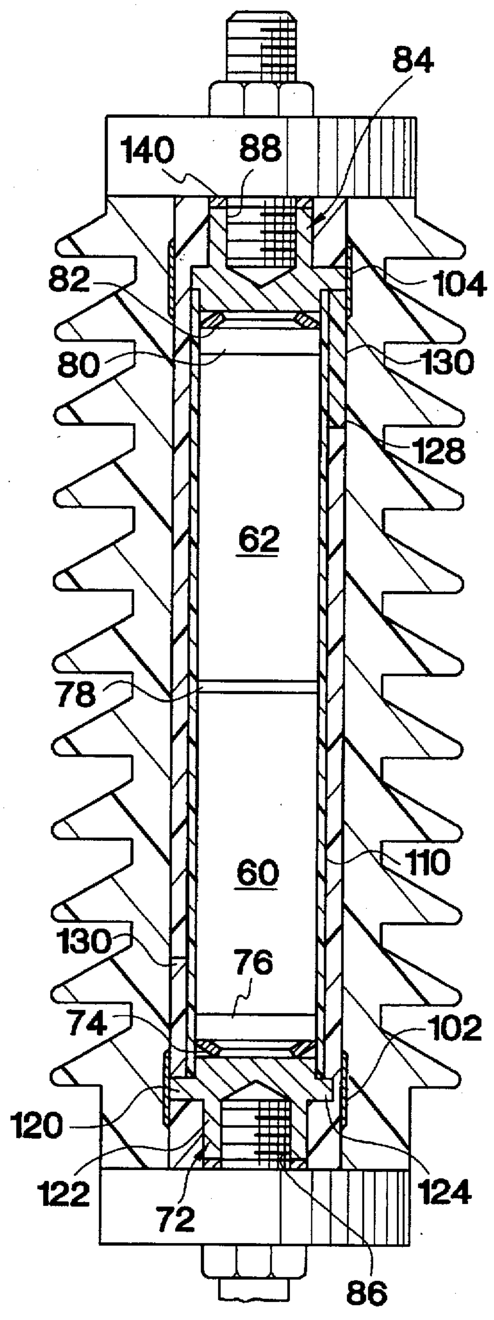
FIG. 2 is a side elevational view in longitudinal section of the assembly illustrated in FIG. 1.
Figure 3:
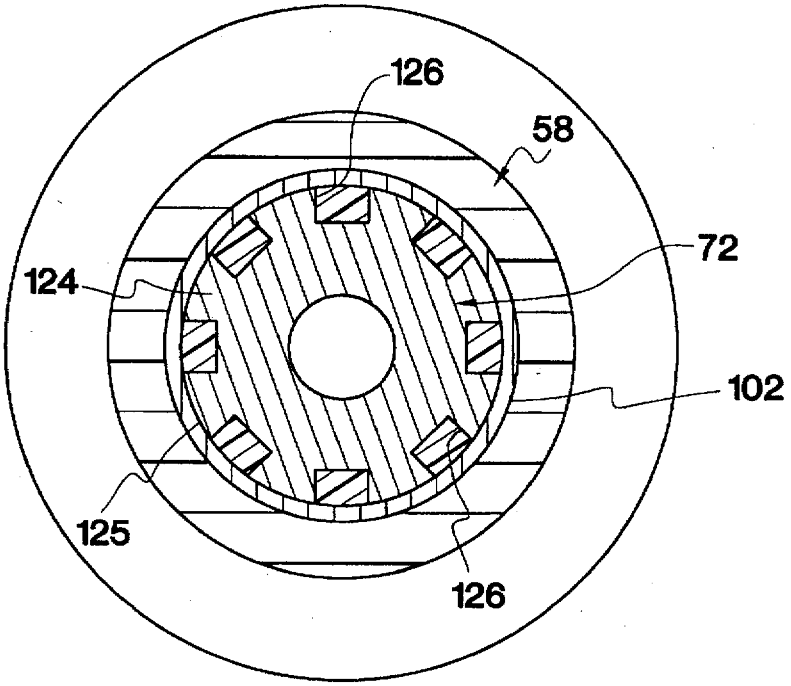
FIG. 3 is an enlarged end elevational view in section taken along line 3—3 of FIG. 1.

Referring to FIGS. 1–3, an electrical device 50, in the form of a surge arrester according to the present invention, is formed of a modular electrical assembly 52, enclosed in a polymeric, elastomeric weathershed housing 58. The illustrated electrical assembly can be advantageously substantially identical to and interchangeable with the other electrical assemblies, and is in turn formed from one or a plurality of cylindrical electrical components 60 and 62. These components are aligned in a row or column, and are in electrical connection with one another through their axially-directed ends and under an axially-directed compressive force developed by a non-conductive filament winding 64, as disclosed in U.S. Pat. No. 5,043,838. The electrical components can be metal oxide varistors (e.g., zinc oxide varistor blocks), resistors, capacitors, or any combination thereof.

In the case of varistors used to form a surge arrester, voltage ratings can be enlarged merely by serially and selectively coupling the plurality of modular electrical assemblies together mechanically and electrically.

The elastomeric weathershed housing 58 receives the electrical assemblies therein via a slight interference fit. This facilitates construction and allows the practice of good dielectric design by reducing radial gaps. The weathershed housing could also be molded directly on the assembly.

Electrical assembly 52 has a substantially cylindrical overall outer surface and comprises first end member or terminal 72, spring washer 74, contact disc 76, electrical component 60, contact disc 78, electrical component 62, contact disc 80, spring washer 82, and second end member or terminal 84 in sequence. Additional spring washers can be employed in the electrical assembly against the contact discs at some or all of the intermediate varistor joints, particularly for base mounted assemblies, to maintain contact pressure when the assembly bends under cantilever loading. The non-conductive filament winding 64 is coupled to end members 72 and 84, encloses the electrical components, and maintains them under an axially-directed force, which is augmented by the spring washers. Cover strips 102 and 104 surround non-conductive filament winding 64 where it joins with end members 72 and 84.

A plastic film barrier 110 laterally surrounds electrical components 60 and 62, and is interposed coaxially between the electrical components and filament winding 64. Preferably, the plastic is polypropylene. The barrier is formed by wrapping a rectangular plastic sheet tightly about the electrical components and the adjacent portions of end members 72 and 84 in two layers before filament winding 64 is added. The thickness of the plastic sheet and of each layer is about 0.0005 inch.

Since the plastic film barrier extends along the entire length of the electrical components and onto the end members, the plastic film barrier seals the electrical components from the epoxy or resin on the filament forming the winding. For surge arresters, this prevents the wet epoxy or resin on the filament from bonding to the fragile ceramic insulating collars on the metal oxide varistor blocks 60 and 62. Such bonding can be prevented by other adhesion blockers, such as silicone oil or grease.

Advantageously, end members 72 and 84 are formed from aluminum. They can also be formed of any other material with suitable conductivity and mechanical strength.

End members 72 and 84 form internal terminals, have cylindrical exposed outer surfaces, and have opposite, first and second axially-directed planar ends with internally threaded sockets or bores 86 and 88 formed respectively therein. Socket 86 threadedly receives threaded end stud 90 which can be connected to an electrical power source and is in the form of a metallic, conductive bolt with an internally threaded nut 91. End plate 92 is received on end stud 90, tightly engages an end of weathershed housing 58 as seen in FIGS. 1 and 2 and is held in place via rigid nut 91 on the stud. For base mounting, a base plate with a bolt circle can be attached. A second end plate 96 is similarly positioned at the other end of the housing and is received on end stud 98 which is connected to ground and maintained thereon via internally threaded nut 99 on the stud. Studs 90 and 98 in essence form external terminals for the overall device 50.

Weathershed housing 58 has a through passageway in the form of a throughbore with an inwardly facing cylindrical surface 100 which tightly receives therein the outer cylindrical surface of the electrical assembly 52. The reception of the assembly in the throughbore is preferably via an interference fit with the assembly having an outer surface diameter that is about 2% to about 9% greater than the throughbore diameter and is substantially constant along its length. This reduces radial gaps and thus provides advantageous dielectric design.

Since end members 72 and 84 are identical, only end member 72 is described in detail. Referring particularly to FIGS. 2 and 3 end member 72 comprises an inner section 120 and an outer section 122 separated by a radially extending flange 124. Inner section 120 is oriented adjacent the electrical components 60 and 62 and has a cylindrical lateral surface with a transverse diameter substantially equal to the electrical components. Inner section 120 defines that portion of the end member which receives film barrier 110. Outer section 122 also has a cylindrical lateral surface, but has a transverse diameter substantially less than inner section 120.

Flange 124 is generally circular in plan view and extends radially outwardly from the interface between sections 120 and 122. Radially inwardly extending and radially outwardly opening notches 126 are formed in the flange. Eight uniformly dimensioned notches are evenly and circumferentially spaced about flange 124 in the illustrated embodiment. The number of notches will vary depending upon the component diameter. More notches will be used with larger component diameters, and less notches will be used with smaller component diameters.

The end members facilitate wrapping a non-conductive filament, e.g., glass in a pattern with diamond shaped lateral openings 128 which are preformed, discrete and longitudinally segmented as illustrated in FIG. 1. Openings 128 are filled with a fracturable insulating material 130 having suitable insulating and mechanical characteristics, for example epoxy. Other suitable insulating materials include polyester, foam, rubber, silicone grease or gas, such as air. If the housing is molded about the electrical assembly wrap, the molded housing material can fill the openings.

The non-conductive filament is wrapped longitudinally (i.e., extending in directions substantially parallel to the arrester longitudinal axis) and crosswise around the varistor blocks (i.e., extending in directions substantially transverse to the arrester longitudinal axis).

The crisscross winding pattern illustrated in FIG. 1 is formed by wrapping one filament, or preferably a plurality of filaments simultaneously (typically 9) as disclosed in U.S. Pat. No. 5,043,838. The wrap pattern used for a particular arrester will depend on component diameter, length and mechanical requirements.

The selected pattern is repeated until the filament develops a thickness equal to the lateral peripheral extent of flange 124. Additional fiber filament is wound about the outer sections 122 until the filament surrounding such sections has an outer peripheral surface at least equal to the outermost extension of the flange. The outer surface of the assembly is then abraded to the extent necessary to provide a uniform cylindrical surface along its entire length.

The insulating material 130 fills the openings 128 to maintain the desired uniform cylindrical surface of assembly 52. However, insulating material 130 can readily break or separate upon the development of adequate internal pressure within the winding, which pressure exceeds the threshold level permitted by epoxy or other insulating material against rupture, to permit gas to vent. Thus, openings 128 form venting means in the tubular member formed by filament winding 64 to facilitate the lateral egress through the filament winding of gaseous products produced by the stack of electrical components 60 and 62.

Upon electrical component failure, gas is released developing tremendous gas pressure within the fiber filament winding. This pressure causes the epoxy or other insulating material to fracture and the gas to escape to the inside of weathershed housing 58. Due to the flexible and resilient nature of elastomeric weathershed housing 58, the housing will expand, permitting the gas to flow along the length of the housing inner surface and out its axial ends. The gas can also vent between adjacent housings in a stacked arrangement, or through a split in the elastomeric housing. Once the gas is released, the housing will contract and again tightly bear against assembly 52. Without this venting of the gas, the gas would be entrapped within the winding until the increasing gas pressure causes an explosion of the assembly. After venting, ionized gas causes an external arc bridging the damaged arrester to relieve the internal fault.

Figure 4:
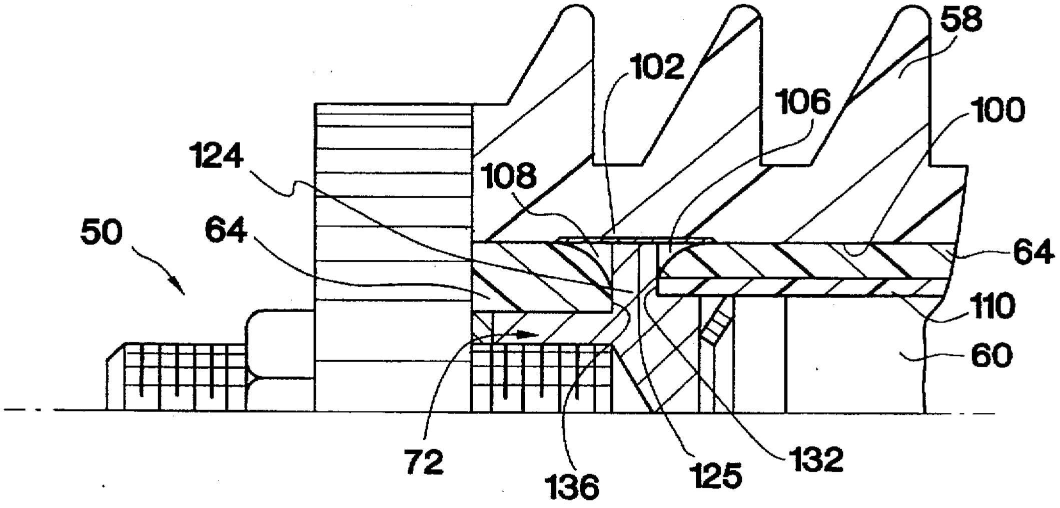
FIG. 4 is an enlarged, partial side elevational view in section of the modular electrical assembly of FIG. 1.

As shown in FIG. 4, non-conductive filament winding 64 adjacent flange 124 of end member 72 is often separated from flange 124, creating voids 106 and 108. Inner void 106 exists adjacent the inner surface 132 of flange 124. Outer void 108 exists adjacent the outer surface 136 of flange 124. Voids can similarly occur between flange surfaces 132 and 136 and insulating material 130. The exact shape and extent of voids 106 and 108 will vary depending upon the filaments and epoxy used and the pattern and precision in which the filaments are wound. However, for the most part, voids 106 and 108 extend along inner and outer surfaces 132 and 136 of flange 124 adjacent the outer radial surface 125 of flange 124. Since notches 126 in flange 124 create a discontinuous outer radial surface 125 as shown in FIG. 3, voids 106 and 108 are likewise discontinuous along the full outer circumference of end member 72 along outer radial surface 125. Voids 106 and 108 have been shown and described relative to end member 72, but the description of voids 106 and 108 is equally applicable relative to end member 84.

Cover strips 102 and 104 are identical and therefore only first cover strip 102 is described in detail. As shown in FIGS. 1 and 3, cover strip 102 is an annular strip forming a cylinder extending completely around and engages the outer circumference of flange 124 of end member 72. Cover strip 102 also engages the interior circumference of cylindrical surface 100 of weathershed housing 58 adjacent flange 124.

Cover strip 102 is preferably seamless and is formed from a thin, conductive material. The material is preferably metal, although other materials can be used. Cover strip 102 is coaxial with the axis of electrical assembly 52, and extends axially a sufficient distance to contact non-conductive filament winding 64 adjacent both the inner and outer sufaces 132 and 136 at the axial ends of flange 124.

As shown in FIG. 4, the width of the cover strip 102 extends beyond the outer radial surface 125 of flange 124 and beyond inner and outer voids 106 and 108 to form a substantially uniform surface for frictional engagement with inner cylindrical surface 100 of housing 58. This placement of cover strip 102 ensures that the sharp edges of flange 124, at the points where its inner surface 132 and outer surface 136 meet flange outer radial surface 125, are covered, thereby protecting inner cylindrical surface 100 of weathershed housing 58 from possible penetration by the sharp edges of flange 124.

Additionally, cover strip 102 provides a more continuous surface along cylindrical surface 100, thereby eliminating radial voids. Once attached to outer radial surface 125 of flange 124, cover strip 102 is frictionally engaged with flange 124 and is maintained in that position during assembly with the housing 58. Cover strip 102 is sufficiently thin to allow electrical assembly 52 to be placed within cylindrical surface 100 of weathershed housing 58 by the same interference fit described above.

To mechanically and electrically connect a plurality of the electrical assemblies together in an aligned, straight end-to-end serial array, externally threaded, metallic, and conductive studs can be used. These studs are advantageously substantially identical and interchangeable, as well as substantially rigid and formed of stainless steel. The studs couple the adjacent ends of adjacent assemblies by being threadedly received in the threaded sockets in each assembly's adjacent end member. The adjacent ends of adjacent assemblies are screwed tightly together on the studs to provide a substantially gap-free engagement between the facing planar, axially-directed outer ends of the end members thereon. This provides an advantageous electrical and mechanical interface by reducing possible separation during bending of the device. Plural weathershed housing sections, or a larger, one-piece housing can be used.

To provide sealing against water invasion, preferably a gasket 140 is interposed between each end member and the adjacent end plate. Additionally, silicone grease is interposed between each adjacent end plate and end member, between adjacent end members, and between the outer surfaces of the electrical assemblies and the inwardly facing surfaces of the throughbore in each weathershed housing section. Use of grease between the weathershed housing section and the electrical assembly aids in construction and assembly by reducing friction and also reduces any radial gaps therebetween.

Advantageously, the longitudinal axes of the studs, the electrical components in each assembly, and the weathershed housing 58 are coaxially aligned. Preferably, the planar ends of the end members are perpendicular to these aligned longitudinal axes.

Preferably, with regard to the electrical device 50, the axial load on the electrical components before winding is about 750 pounds per square inch, and the filament or stranded element of fibers is wet, epoxy coated fiberglass which is wound through about 100 turns and is cured for about two hours at 150° C.

While a particular embodiment has been chosen to illustrate the invention, it will be understood by those skilled in the art that various changes and modifications can be made therein without departing from the scope of the invention as defined in the appended claims.

What is claimed is:

1. A modular electrical assembly, comprising:

a plurality of conductive electrical components, aligned in a column along an axis and having axially directed ends, said electrical components being electrically connected at said axially directed ends;

first and second conductive end members located at opposite ends of said column, said end members having shoulders extending radially relative to said axis, each of said shoulders having an outer surface facing radially outwards;

a non-conductive winding wrapped in a predetermined pattern about said electrical components and said end members, engaging said shoulders, and applying an axially directed compressive force through said shoulders on said electrical components and end members to maintain electrical connection therebetween;

a housing encompassing said winding; and a first strip located between said housing and said winding, and covering said outer surface of said first end member to protect said housing from contact with said outer surface.

2. A modular electrical assembly according to claim 1 wherein a second strip is located between said housing and said winding, said second strip covering said outer surface of said second end member.

3. A modular electrical assembly according to claim 1 wherein said first strip has an annular shape.

4. A modular electrical assembly according to claim 2 wherein said first strip is formed from conductive material.

5. A modular electrical assembly according to claim 1 wherein said first strip extends coaxial to said axis and axially beyond said outer surface of said first end member, and overlies portions of said winding adjacent said shoulder of said first end member.

6. A modular electrical assembly according to claim 4 wherein said outer surface of said first end member has edges;

voids exist between said edges and said portions of said winding adjacent said shoulder of said first end member; and said first strip further extends axially a distance over said voids.

7. A modular electrical assembly according to claim 1 wherein said electrical components are varistors.

8. A modular electrical assembly according to claim 7 wherein said varistors are generally cylindrical metal oxide varistors.

9. A modular electrical assembly according to claim 1 wherein said winding has a first plurality of strand portions forming a first layer and a first opening therein and having a second plurality of strand portions forming a second layer and a second opening therein, said first and second openings having substantially the same shape and being substantially aligned to form a common opening for venting gas upon failure of one of said electrical components, said common opening extending completely through said winding radially relative to said axis.

10. A modular electrical assembly according to claim 9 wherein said opening is filled with fracturable insulating material.

11. A modular electrical assembly according to claim 1 wherein each said shoulder comprises a radially extending flange on the respective end member with circumferentially spaced notches therein, said notches receive portions of said winding, open radially outwardly relative to said axis, and extend through said flanges parallel to said axis.

12. A modular electrical assembly according to claim 11 wherein said first strip extends coaxial to said axis and axially beyond said outer surface of said first end member, and overlies portions of said winding adjacent said shoulder of said first end member.

13. A modular electrical assembly according to claim 11 wherein each said end member comprises a reduced diameter section on a side of the flange thereof remote from said electrical component, said winding extending about said reduced diameter section to provide a substantially uniform transverse diameter along the entire axial length of the electrical assembly.

14. A modular electrical assembly according to claim 1 wherein said housing is resilient.

15. A modular electrical assembly according to claim 14 wherein said housing is elastomeric.

16. A modular electrical assembly according to claim 15 wherein said housing coaxially surrounds and frictionally engages said winding and said first strip.

17. A modular electrical assembly according to claim 16 wherein said housing has an internal throughbore forming an interference fit with said winding and said first strip.

18. A modular electrical assembly, comprising:

a plurality of cylindrical conductive electrical components, aligned in a column along an axis and having axially directed ends, said electrical components being electrically connected at said axially directed ends;

first and second conductive end members located at opposite ends of said column, said end members having shoulders extending radially relative to said axis, each of said shoulders comprising an outer surface with edges, said outer surface facing radially outwards, and a radially extending flange on the respective end member with circumferentially spaced notches therein opening radially outwardly relative to said axis and extending through said flanges parallel to said axis;

a non-conductive winding wrapped in a predetermined pattern about said electrical components and said end members, engaging said notches, and applying an axially directed compressive force through said shoulders on said electrical components and end members to maintain electrical connection therebetween;

voids existing between said edges of said first end member and said portions of said winding adjacent said shoulder of said first end member;

an elastomeric, resilient housing encompassing said winding;

a first annular, conductive strip located between said housing and said winding, covering said outer surface of said first end member to protect said housing from contact with said outer surface, and extending axially beyond said outer surface of said first end member a distance over said voids; and a second annular, conductive strip located between said housing and said winding, covering said outer surface of said second end member to protect said housing from contact with said outer surface, and extending axially beyond said outer surface of said second end member a distance over said voids.

* * * * *